(12) United States Patent
Labroille et al.

(10) Patent No.: US 11,231,551 B2
(45) Date of Patent: Jan. 25, 2022

(54) OPTICAL DEVICE POSSESSING MEANS FOR THE PRECISE ASSEMBLY THEREOF, ASSEMBLY OR TEST METHOD FOR THE DEVICE

(71) Applicant: CAILabs, Rennes (FR)

(72) Inventors: Guillaume Labroille, Rennes (FR); Nicolas Barré, Rennes (FR)

(73) Assignee: CAILabs, Rennes (FR)

( * ) Notice: Subject to any disclaimer, the term of this patent is extended or adjusted under 35 U.S.C. 154(b) by 23 days.

(21) Appl. No.: 16/959,050

(22) PCT Filed: Dec. 17, 2018

(86) PCT No.: PCT/FR2018/053325
§ 371 (c)(1),
(2) Date: Jun. 29, 2020

(87) PCT Pub. No.: WO2019/129949
PCT Pub. Date: Jul. 4, 2019

(65) Prior Publication Data
US 2020/0341198 A1 Oct. 29, 2020

(30) Foreign Application Priority Data
Dec. 28, 2017 (FR) ...................................... 1763315

(51) Int. Cl.
*G02B 6/26* (2006.01)
*G02B 27/62* (2006.01)

(52) U.S. Cl.
CPC ............. *G02B 6/264* (2013.01); *G02B 27/62* (2013.01)

(58) Field of Classification Search
CPC .......... G02B 6/264; G02B 6/26; G02B 6/262; G02B 27/62
See application file for complete search history.

(56) References Cited

U.S. PATENT DOCUMENTS

| 9,250,454 B2 | 2/2016 | Morizur et al. |
| 2011/0083742 A1* | 4/2011 | Munro ............... G02B 27/1006 136/259 |

(Continued)

FOREIGN PATENT DOCUMENTS

| WO | 2016/110667 A1 | 7/2016 |
| WO | 2017/158261 A1 | 9/2017 |

OTHER PUBLICATIONS

Barre et al., Broadband, Mode-Selective 15-Mode Multiplexer Based on Multi-Plane Light Conversion, 2017 Optical Fiber Communications Conference and Exhibition (OFC), OSA, (Mar. 19, 2017, 3 pages.

(Continued)

*Primary Examiner* — Thomas A Hollweg
*Assistant Examiner* — Mary A El-Shammaa
(74) *Attorney, Agent, or Firm* — TraskBritt

(57) ABSTRACT

An optical device is formed of a plurality of optical parts arranged on a carrier, at least one optical element of which has a main face provided with a first microstructured zone for intercepting incident luminous radiation propagating along a first determined optical path, the first microstructured zone spatially modifying the phase of the incident luminous radiation according to a determined spatial profile. The first microstructured zone is used to form, via a plurality of reflections or transmissions off/through the one or more optical elements, transformed luminous radiation. The optical device comprises an input stage for guiding the injection of positioning luminous radiation, along a second optical path, and the main surface of the optical element includes a second microstructured zone that is configured to reflect the positioning luminous radiation and to back-propagate the positioning radiation along the second optical path.

20 Claims, 4 Drawing Sheets

(56) References Cited

U.S. PATENT DOCUMENTS

| | | | |
|---|---|---|---|
| 2013/0148969 A1* | 6/2013 | Sheu | H04B 10/40 398/79 |
| 2014/0051955 A1* | 2/2014 | Tiao | A61B 5/14552 600/323 |
| 2014/0320672 A1 | 10/2014 | Little | |
| 2017/0010463 A1 | 1/2017 | Morizur et al. | |
| 2021/0271491 A1* | 9/2021 | Li | G06F 9/44505 |

OTHER PUBLICATIONS

International Search Report for International Application No. PCT/FR2018/053325 dated Apr. 2, 2019, 2 pages.

International Written Opinion for International Application No. PCT/FR2018/053325 dated Apr. 2, 2019, 5 pages.

Morizur et al., Programmable Unitary Spatial Mode Manipulation, J. Opt. So. Am. A, vol. 27, No. 11, (Nov. 2010), pp. 2524-2531.

* cited by examiner

OPTICAL DEVICE POSSESSING MEANS FOR THE PRECISE ASSEMBLY THEREOF, ASSEMBLY OR TEST METHOD FOR THE DEVICE

CROSS-REFERENCE TO RELATED APPLICATIONS

This application is a national phase entry under 35 U.S.C. § 371 of International Patent Application PCT/FR2018/053325, filed Dec. 17, 2018, designating the United States of America and published as International Patent Publication WO 2019/129949 A1 on Jul. 4, 2019, which claims the benefit under Article 8 of the Patent Cooperation Treaty to French Patent Application Serial No. 17/63315, filed Dec. 28, 2017.

TECHNICAL FIELD

The present disclosure relates to an optical device for manipulating light radiation. It relates more particularly to a device of this kind comprising means allowing for the precise assembly thereof or, in a more general manner, precise relative positioning of the optical parts of which it is made up. The means can be implemented during the assembly of the device, or in order to check the correct functioning thereof during use.

BACKGROUND

U.S. Pat. No. 9,250,454 and US2017010463 disclose optical devices, which are known by the acronym MPLC (Multi Plane Light Conversion) and make it possible to perform any kind of unitary spatial transformation of light radiation.

From a theoretical perspective, and as has been established in "Programmable unitary spatial mode manipulation," Morizur et al, J. Opt. Soc. Am. A/Vol. 27, no. 11/November 2010, a unitary spatial transformation can essentially be broken down into a succession of primary transformations, each primary transformation affecting the profile of the transverse phase of the light radiation. In practice, and without this in any way restricting the technology, the MPLC components typically apply between 3 and 25 primary transformations.

The document "G. Labroille, P. Jian, N. Barré, B. Denolle, and J. Morizur, "Mode Selective 10-Mode Multiplexer based on Multi-Plane Light Conversion," in *Optical Fiber Communication Conference*, OSA Technical Digest (online) (Optical Society of America, 2016), paper Th3E.5." discloses a particular embodiment of an MPLC device. The device comprises a support on which an entry stage has been arranged, making it possible to guide the injection of incident light radiation into the device, an output stage for guiding the extraction of the transformed light radiation from the device, a mirror that is arranged opposite a reflective optical element in order to form a multi-passage cavity and makes it possible to reflect the incident light radiation on the optical element a plurality of times. The optical element comprises a microstructured main surface for applying a modification of the transverse phase signal to each reflection of the incident radiation.

The parts that make up a device of this kind must be positioned and oriented relative to one another, at a very high degree of accuracy. This accuracy is necessary in order to ensure that the incident light radiation intercepts the optical element exactly in the region of the microstructured zone, in order to provide it with a selected transformation. This need for precision in arranging the optical parts making up the device is all the more significant because one single part may intercept the optical path of the incident radiation several times (typically between 3 and 25 times), as has just been stated, with the result that a minimal deviation in the positioning or orientation with respect to the required positioning can have a significant effect on the correct functioning of the device.

Furthermore, the optical positioning tolerances (on the order of a micrometer and microradian, with regard to the angular precision) are much smaller than the geometric manufacturing tolerances of the parts (at least if parts that can be produced at a reasonable cost are sought), with the result that the position of these parts, in the assembly positions thereof, generally cannot be established in advance with the necessary precision.

In order to assemble the pieces onto the support, and, in particular, in order to form the multi-passage cavity, firstly the entry stage, the mirror, and the optical element are positioned roughly with respect to one another. Incident light radiation is injected into the cavity formed in this manner, and the intensity of the light signal at the outlet of the cavity is detected. The relative position and orientation of the entry stage, the mirror and the optical element are adjusted as finely as possible, according to all the available degrees of freedom, in order to optimize the detected intensity. The optimal relative positioning and orientation are fixed temporarily, for example, by means of adjustable retaining clamps.

Alignment cubes (or more generally alignment parts) having planar faces and having mutually perpendicular connecting faces are then used in order to fix the entry stage, the mirror and the optical element in the optimal support positions thereof, by means of an adhesive layer.

The quality of the optical alignment of the assembly, and, in particular, that of the cavity, is determined at least in part by the relative positioning and orientation of the parts with respect to one another, achieved on the basis of the detection of the intensity of the output light signal. Although this approach has demonstrated its effectiveness, this method results in relative positioning and orientation of the parts, which can be further improved.

It would also be desirable to be able to evaluate the correct mutual arrangement of the optical parts while the product is in use, in order to simply verify the correct functioning thereof or to make it possible to compensate for differences in positioning and orientation that would result.

BRIEF SUMMARY

With a view to achieving at least one of the goals, embodiments of the present disclosure include an optical device formed of a plurality of optical parts arranged on a support, at least one optical element of which includes a main surface provided with a first microstructured zone for intercepting incident light radiation, which propagates along a first determined optical path, the first microstructured zone spatially modifying the phase of the incident light radiation according to a determined spatial profile, and for forming transformed light radiation, by means of a plurality of reflections or transmissions on the optical element(s).

According to the present disclosure, the optical device comprises an entry stage for guiding the injection of positioning light radiation, according to a second optical path. The main surface of the optical element comprises a second textured zone that is designed to reflect the positioning light radiation and to back-propagate the positioning radiation along the second optical path.

Any deviation, even small, of the positioning or the orientation of one of the optical parts affects the propagation of the back-propagated radiation and the power of the radiation, which can be collected in the region of the entry stage. This very sensitive measure makes it possible to ensure very precise positioning of the parts to be positioned.

According to other advantageous and non-limiting features of the present disclosure, taken individually or in any technically possible combination:

- the optical device comprises an output stage for the transformed light radiation;
- the incident light radiation is injected via the entry stage; the transformed light radiation is extracted via the entry stage;
- the optical element is transparent with respect to the incident light radiation, and the transformed radiation is formed, at least in part, by means of transmission of the incident radiation through the transparent optical element;
- the optical element is reflective, and the transformed radiation is formed, at least in part, by means of reflection of the incident light radiation on the reflective optical element;
- the optical device comprises a mirror that is arranged opposite the reflective optical element in order to form a multi-passage cavity and to make it possible to project the incident light radiation and the positioning light signal along the first and the second optical path, respectively, a plurality of times.
- the second microstructured zone is designed so as to apply a transformation to the positioning radiation during the reflections or the transmissions preceding the back-propagation reflection;
- the optical element is a wave plate, a deformable mirror, or a spatial light modulator;
- the support is a planar support or a frame;
- the entry stage comprises at least one positioning optical fiber for injecting the positioning radiation.

According to another aspect, the present disclosure includes an assembly or testing system for the optical device, the system comprising a light source that is optically connected to the positioning optical fiber, and a device for measuring the power of the back-propagated light radiation.

According to other advantageous and non-limiting features of this aspect of the present disclosure, taken individually or in any technically possible combination:

- the assembly or testing system comprises a circulator and/or a separator between the light source and the positioning optical fiber, in order to extract the back-propagated light radiation toward the measuring device;

And according to another aspect, further embodiments of the present disclosure include an evaluation method for the optical device, comprising the following steps:

a. injecting positioning light radiation into the optical device via the entry stage;
b. measuring the power of the back-propagated signal.

According to other advantageous and non-limiting features of this method, taken individually or in any technically possible combination:

- the evaluation method comprises a step of determining the operational state of the optical device, in accordance with the measured power value;
- the evaluation method comprises a step that aims to temporarily place the optical parts in a relative manner, with respect to one another, before injecting the positioning light radiation;
- the evaluation method comprises:
  a step of adjusting the relative placement of the optical parts in order to achieve a target measurement of the power or to maximize the measurement of the power and establish a determined position and a determined orientation;
  a step for fixing the mutual relative placement of the optical parts in the determined position and orientation; the step of temporary placement comprises definitive fixing of the optical element on a planar support.

BRIEF DESCRIPTION OF THE DRAWINGS

Other features and advantages of the present disclosure will become clear from the following detailed description of example embodiments of the present disclosure, with reference to the accompanying drawings, wherein.

DETAILED DESCRIPTION

In order to simplify the following description, the same reference signs are used for identical elements or elements performing the same function in the different variants of the device described.

For the purpose of clarity, in the present application light radiation is defines as radiation forming at least one embodiment of the electromagnetic field, each embodiment forming a spatial-frequency distribution of the amplitude, the phase, and the polarization of the field.

Therefore, the modification or transformation the phase of the light radiation denotes the spatial-frequency modification or transformation of each of the radiation modes.

The "shape" of radiation denotes the transverse distribution of the amplitude and of the phase of the mode or the combination of the transverse distributions of amplitude and phase of the modes forming the radiation.

For the purpose of simplification, it will be considered, in the present description, that the radiation is polarized according to a single direction, and has a single frequency. However, the principles set out are entirely applicable to radiation having more than one polarization direction or more than one single frequency.

In a very general manner, an optical device 1 according to the present disclosure is made up of a set of optical parts that are designed for manipulating incident light radiation and forming transformed light radiation, the manipulation comprising controlled modification of the transverse phase profile of the incident light radiation, over the course of a plurality of primary transformations which, in combination, contribute to operating a determined optical function. It could be the case that 4 primary transformations or more (by means of reflection and/or transmission) are performed, such as, for example, 8, 10, 12, 14, or even 20 or more primary transformations.

The determined optical function may correspond to spatial multiplexing or demultiplexing of the incident radiation or, even more generally, to any modal manipulation of the incident radiation. Advantageously, the shape of the incident light radiation and the shape of the transformed light radiation are different from one another.

Figure 1:
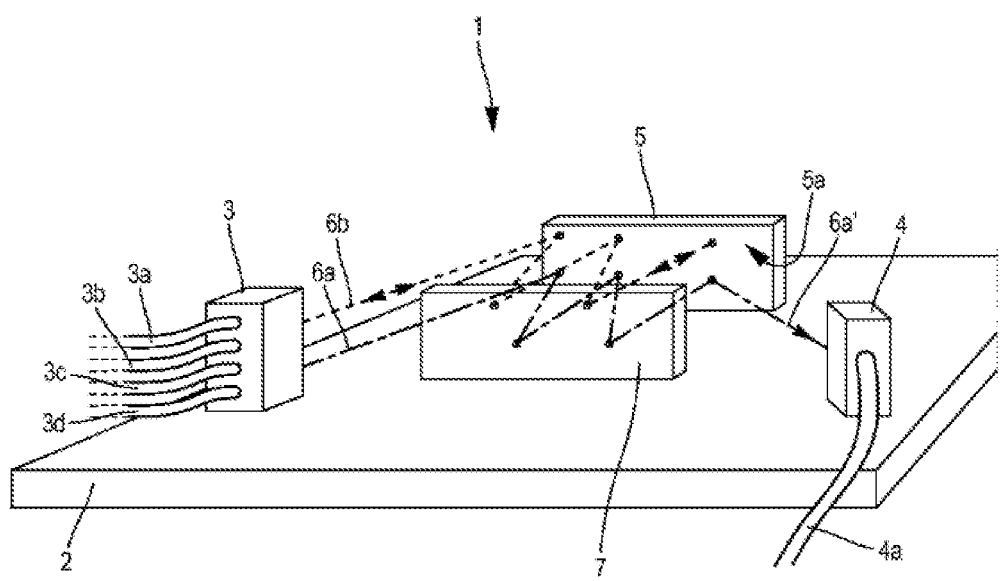
FIG. 1 shows a preferred embodiment of an optical device 1 according to the present disclosure.

FIG. 1 shows a preferred embodiment of an optical device 1 according to the present disclosure.

The optical device 1 comprises, assembled on a support 2, an entry stage 3 for guiding the injection of the incident light radiation. In an alternative, the light radiation is injected into the device 1 by means of simple propagation in free space, from a light source such as a laser source. It will be noted that the support 2 is not necessarily a planar support; it may be a frame on which the different optical parts of the device 1 are fixed, optionally such that it is possible to adjust the positions and/or orientations thereof.

The optical device 1 comprises an optical element 5 that is also assembled on the support 2. The optical element 5 and the entry stage 3 (or the light source when the radiation is injected by means of free propagation) are arranged, with respect to one another, in a relative position and an orientation for which the incident light radiation propagates in order to be projected on a main surface 5a of the optical element 5, along a first optical path 6a. The function of the optical element 5 is that of assigning the determined optical function to the incident light radiation.

In the embodiment shown in FIG. 1, the optical element 5 is reflective. A mirror 7 is arranged very precisely with respect to the optical element 5, in order to form a multi-passage cavity. The incident light radiation 6a originating from the entry stage 3 is reflected a plurality of times on the main surface 5a of the optical element 5, and on the opposite face of the mirror.

Entry Stage

In the embodiment shown in FIG. 1, the entry stage 3 comprises a bundle of optical fibers 3a, 3b, 3c, 3d that are arranged linearly and precisely with respect to one another, in a direction perpendicular to the support 2. However, it could be possible to arrange the bundle of fibers in accordance with another configuration, without departing from the scope of the present disclosure.

Each optical fiber makes it possible to inject positioning light radiation into the optical device 1. At least one of the instances of radiation, referred to in the following as the "positioning radiation" is injected into the optical device 1 by at least one positioning optical fiber of the entry stage. The positioning radiation is intended to be used for allowing for very high-precision positioning of the parts of the optical device 1, the assembly thereof, the testing thereof, or the functional diagnosis thereof. In the embodiment shown in FIG. 1, other radiation, referred to in the following as the incident radiation, is injected into the optical device by at least one positioning optical fiber of the entry stage 3. The incident radiation is intended to be manipulated and transformed by the optical device 1.

Each optical fiber comprises an emission end that is oriented toward the optical element 5. The end can be equipped with a microlens, making it possible to collimate the light radiation and to control the propagation thereof in the optical device 1. Each microlens can be integrated at the entry stage 3 or assembled at the stage, opposite each of the emission ends of the fibers 3a, 3b, 3c, 3d. The other end of the optical fibers of the entry stage can be connected to a light source or to the end of another optical fiber, wherein useful light radiation propagates, which radiation is intended to be manipulated using the optical device 1.

The optical fibers of the entry stage may be monomode or multimode. An entry stage may comprise any number of optical fibers, typically from 1 to several tens. However, the positioning fiber(s) is (are) preferably monomode.

The entry stage 3, as well as all the other optical parts arranged on the support 2, can be assembled by means of adhesive bonding, in the assembly position thereof, on the support 2. It is possible to provide for the use of alignment parts, as has been set out in the preamble of this application, in order to fix the positioning and the orientation of each of the optical parts to the support at a high degree of precision and a high degree of robustness. For the sake of clarity of FIG. 1, the alignment parts have not been shown there. Alternatively, the optical parts can be retained in position, with respect to the support 2, using retention means, the means possibly being able to allow for the relative displacement of the parts with respect to one another.

Output Stage

As has already been set out above, incident light radiation 6a, which can originate from the entry stage 3, is manipulated and transformed during the successive reflections on the optical element 5. The transformed light radiation 6a' emerges from the multi-passage cavity again, in order to each an output stage 4 of the optical device 1. The output stage 4 makes it possible to couple the transformed radiation 6a' to an output optical fiber 4a in order to guide the extraction of the transformed light radiation from the device 1, with the aim of the transmission and/or treatment thereof.

Of course, the positioning of the output stage 4 on the support must also be achieved at a high degree of precision, in order to allow for the most perfect coupling possible. However, the position and the orientation of the output stage 4 on the support 2 can be achieved in a second step, and independently of the positioning of the entry stage and the parts forming the multi-passage cavity of the support 2.

Depending on the function performed by the optical device 1, the output stage 4 may comprise a plurality of output optical fibers 4a, each being intended to receive the transformed light radiation 6a' or a portion thereof. For example, when the optical device 1 is designed to perform spatial demultiplexing, each incident light radiation mode 6a is spatially isolated, by the optical element 5, from the multi-passage cavity, and each isolated mode of transformed radiation 6a' propagates precisely, in the region of the end portion of an output fiber 4a, in order to couple optically there and propagate there.

The optical fibers of the output stage 4 may be monomode or multimode.

It will be noted that the output stage 4 is not an element that is essential to the present disclosure, and that it is possible that the transformed light radiation may be extracted from the device 1 by means of propagation in free space.

Microstructured Optical Element

As has just been stated, the microstructured optical element 5 (also referred to simply as "optical element" in the present description) performs the transformation of the incident light radiation 6a into transformed radiation 6a'. For this purpose, the main surface 5a on which the incident light radiation 6a is projected a plurality of times, comprises a first microstructured zone. The microstructured zone spatially modifies the transverse phase of the incident light radiation 6a, according to a determined spatial profile.

Reference can be made to the various prior art documents cited, in order to fully understand the way in which the repeated transformation of the spatial phase of the incident light radiation 6a makes it possible to perform a selected transformation of the incident light radiation, and how it is possible to design the optical element 5 in order for it to implement a transformation of this kind. Reference is also made to the documents in order to obtain examples of digital design methods for the microstructures arranged on the main surface 5a of the optical element 5. The digital model and the microstructures may be used in order to produce the optical element, for example, by means of machining, molding and/or etching of an untreated optical part.

"Microstructured face or surface" means, by way of example, that the face or the surface may comprise "pixels," the dimensions of which are between a few microns and a few hundred microns. Each pixel has an elevation, relative to a median plane defining the face or the surface in question, of at least a few microns or at most a few hundred microns.

In the case of the preferred embodiment shown in FIG. 1, the optical element 5 is a reflective wave plate. In combination with the reflective surface of the mirror 7, the main surface 5a is sufficiently extended in order that a plurality of reflections of the incident light radiation 6a are performed there.

However, several variants of this configuration having a multi-passage cavity are possible, without departing from the scope of the present disclosure.

It is thus possible that the optical device 1 may comprise a plurality of optical elements 5, for example, a plurality of reflective wave plates that are juxtaposed with respect to one another. The plurality of optical elements 5 may be arranged on the support in order to form a complex first optical path, for example, in order to aim to make the optical device very compact. In this variant, the mirror 7 of the multi-passage cavity may be replaced by a second microstructured reflective wave plate, in order to double the number of primary transformations performed on the incident light radiation 6a, or to make it possible for a given number of reflections, to form a multi-passage cavity that is more than twice as compact.

According to another variant, the optical element 5 is not reflective but transparent. It is thus possible to provide for a transparent microstructured optical element 5, for example, placed in an optical cavity formed by two mirrors placed opposite one another, to be able to intercept the first optical path 6a of the incident light radiation a plurality of times, so as to perform the transformations there. It may alternatively be a plurality of transparent optical elements 5 arranged one behind the other along the first optical path.

It is also conceivable to combine one or more transparent optical elements 5 with one or more reflective optical elements 5. Other optical parts, such as mirrors or prisms, may also be placed along the first optical path, as needed.

However, the configuration shown in FIG. 1, comprising the multi-passage cavity formed of an optical element 5 and a mirror, has been found to be a preferred configuration, forming a good compromise between the performance level, the versatility of the transformations that it can perform, and the ease of the assembly thereof.

Positioning Means

According to the present disclosure, the optical device 1 is designed such that positioning light radiation 6b is also injected into the multi-passage cavity, along a second optical path 6b. The injection of the positioning radiation can, in particular, be useful, as will be explained in the following, during positioning of the optical parts, for example, during assembly of the device 1 and/or for the diagnosis thereof at the end of the assembly line or on site.

In order to allow for the injection, the entry stage 3 comprises at least one positioning optical fiber that is dedicated to injecting the positioning radiation.

The main surface 5a of the optical element 5 is also provided with a second microstructured zone 5c, 5d, which intercepts the second optical path 6b at least once. The function of the second microstructured zone 5c, 5d is at least that of reflecting the positioning light radiation 6b in order to back-propagate it along the second optical path, toward the entry stage 3. For this purpose, the second microstructured zone 5c, 5d comprises a reflective part 8. This may be a reflective surface that is oriented perpendicularly with respect to the direction of propagation of the positioning radiation, or, as is shown in FIG. 2, correspond to a texture of the wave plate taking the form of a blazed grating.

Figure 2:
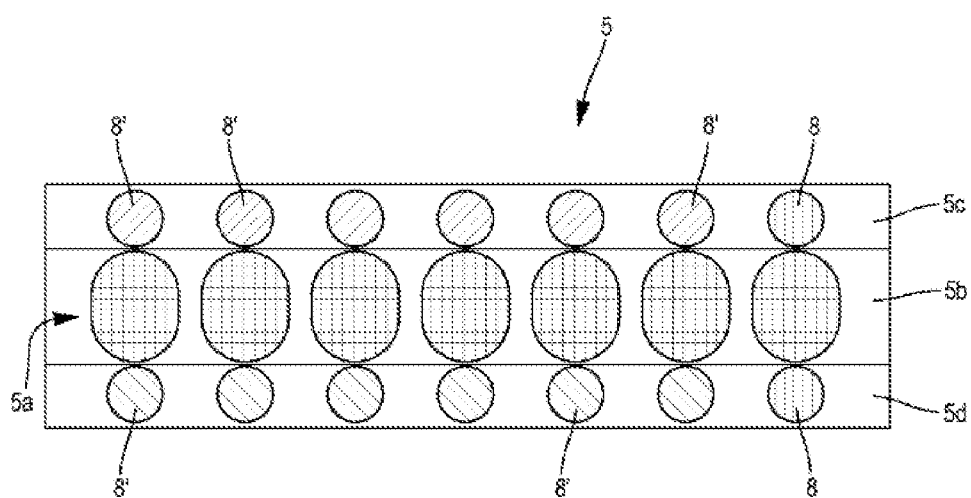
FIG. 2 shows a main surface of a wave plate that forms an optical element of the preferred embodiment of FIG. 1.

FIG. 2 thus schematically shows, by way of example, a view of the main surface 5a of the wave plate 5 forming the optical element of the preferred embodiment of FIG. 1. The first microstructured zone 5b comprising a plurality of sub-zones arranged along a main direction of the optical element 5 can be seen in FIG. 2. The microstructured sub-zones are shown by hatched outlines. Varying the elevation, from one point to another, of a sub-zone of the main surface of the plate, affects the propagation distance of the radiation, which is projected there, and results in modification of the transverse spatial phase profile thereof.

The main surface 5a of the optical element 5 also comprises, in the embodiment shown, two second microstructured zones 5c, 5d arranged on either side of the first zone 5b. Each second microstructured zone 5c, 5d is intended to receive and reflect the positioning light radiation 6b. Each second microstructured zone 5c, 5d comprises a reflective part 8 and a plurality of sub-zones 8'. The sub-zones 8' are designed to at least propagate and back-propagate the positioning light radiation 6b along the second optical path.

In a general manner, the sub-zones of the first and of the second microstructured zone 5b, 5c, 5d are arranged on the wave plate 5 so as to precisely correspond to the zones intercepted by the positioning radiation 6b and the incident radiation 6a on the main surface 5a of the wave plate 5, when the entry stage 3, the optical element 5, and, in the case of the configuration of FIG. 1, the mirror 7, are arranged precisely on the support (i.e., positioned perfectly, with respect to one another, in order to render functional the optical device 1).

Moreover, when the entry stage 3, the optical element 5 and the possible other optical parts arranged along the second optical path are all arranged precisely on the support 2, in the design positions thereof, the positioning radiation 6b is reflected by the reflective part 8 and thus back-propagated on the optical path 6b in order to intercept the entry stage 3, in the region of the emission end of the positioning optical fibers 3a, 3d. Any deviation in positioning or orientation of one of the elements with respect to the optimal position causes the backpropagation of the positioning radiation 6b to deviate from the optimal optical path leading to the positioning optical fibers 3a, 3d. Thus, in the region of the fibers, a back-propagated signal is collected having less optical power than that collected when all the optical parts are positioned precisely on the support 2.

In other words, in the optimal position and orientation of the optical parts on the support 2, the back-propagated positioning radiation optically couples to the positioning optical fibers 3a, 3d from which it originates, and continues its propagation inside the fiber.

As will be explained in detail in the following, the mechanism may be used in order to precisely position the optical parts arranged along the second optical path on the support.

It is particularly advantageous for there to be a plurality of second microstructured zones 5, 5d, which are separate from one another. It is thus possible to improve the precision of the alignment of the different optical parts, in particular, with respect to the angular positioning of the entry stage 3 according to an axis corresponding to the direction of injection of the radiation. In this case, each microstructured zone is designed to receive positioning radiation originating from a positioning optical fiber dedicated thereto.

Likewise advantageously, the second microstructured zone(s) 5c, 5d is (are) arranged along an edge of the optical element 5. Thus, the central surface of the main surface 5a of the optical element 5 is preserved, in order that it can be dedicated to treating the incident light radiation 6a. Indeed, greater positioning precision, in particular, in rotation, is achieved by arranging the second microstructured zones 5c, 5d on either side of the main zone 5b. In order to improve the precision in this case, in particular, the optical element 5 is selected such that the main surface thereof should be as flat as possible, for example, so as to have a flatness error of less than 100 nm.

As has been seen, the second microstructured zone 5c, 5d may comprise, in addition to the reflective part 8, a plurality of microstructured sub-zones 8' corresponding to the successive interception of the second optical path 6b with the optical element 5. The microstructures of the sub-zones 8' are designed to promote the dispersion of the positioning light radiation 6b when, in contrast, the optical parts are not perfectly positioned with respect to one another. For this reason, they can apply a complex transformation. Moreover, the microstructures of the sub-zone 8' also make it possible to shape the wavefront of the positioning light radiation in order for it to be flat, or as flat as possible, when it is reflected in the region of the reflective part 8, in order to promote the reflective effect and to back-propagate the positioning radiation on the second optical path in a precise manner.

Thus, a positioning mechanism is formed that is very sensitive to any deviation in alignment.

It will be noted that the transformations performed in the region of each sub-zone 8', during the propagation along the second optical path, apply identically during the backpropagation of the radiation, such that back-propagated radiation having an identical phase profile to that which is emitted appears in the region of the entry stage 3 of the device 1, insofar as the alignment of the optical parts is achieved perfectly. This makes it possible to ensure the coupling of the back-propagated light radiation to the fiber, by means of modal matching, whatever the mode transformation carried out along the second optical path 6b. From this perspective, it is advantageous, as has been noted above, for the positioning fiber(s) to be monomodal.

Vice versa, a deviation in the positioning or orientation of one of the optical parts arranged along the second optical path results in the formation, in the region of the end of the positioning fiber 3a, 3d, of radiation of which the mode is no longer perfectly adjusted to that of the fiber (when this is monomodal), which restricts the capacity thereof for coupling, and the transmission of all the back-propagated power.

It will therefore be understood that the present disclosure makes it possible to gamble on the precise localization of the back-propagated radiation with respect to the positioning fiber, and on the phase transformations, which are performed on the optical outward and return path, in order to make it possible to precisely assemble the optical parts on the support 2.

However, it is not essential for the second microstructured zone 5c, 5d of the optical element 5 to comprise textured sub-zones 8'. The sub-zones can be replaced by simple reflections, which, in this case, do not impose any particular phase transformation, but nonetheless make it possible to guide the positioning radiation 6b as far as the region of the reflective part 8.

The reflective part 8 and the reflective sub-zones 8' are likewise not necessarily arranged as shown in FIG. 2. They may be entirely separate from the sub-zones of the first structured zone 5b, overlap them in part, or overlap one another.

Whether or not the second structured zone comprises structured sub-zones 8', the reflective part 8 is preferably arranged on the main surface 5a of the optical element 5, on the side opposite the entry stage. This thus brings the advantage of multiple reflections that are performed on the optical radiation and which tend to amplify any positioning deviation in order to make the position mechanism, only, very sensitive. However, it could be possible for the reflective part 8 to be positioned at a different location of the main surface 5a of the optical element 5. This is the case, in particular, when the optical element comprises a plurality of textured second zones, each of which is associated with positioning radiation emitted by a fiber that is separate from the entry stage.

Assembly and/or Testing System

Figure 3:
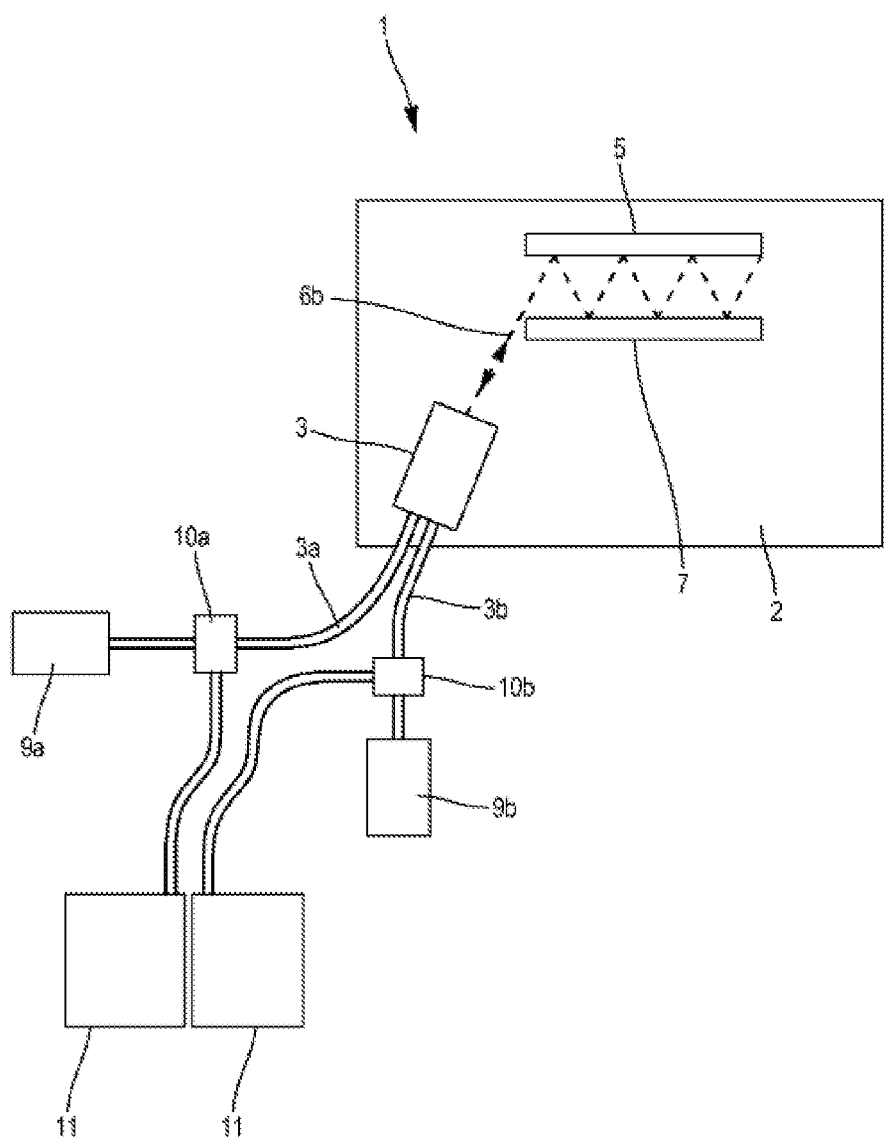
FIG. 3 is a schematic view from above of an assembly or testing system for an optical device 1 according to the present disclosure.

FIG. 3 is a schematic view from above of an assembly or testing system that makes use of the positioning means, which have just been described.

During the assembly of the optical device 1, the entry stage 3, the optical element 5 and the mirror 7 (and, in a more general manner, at least some of the optical elements making up the device 1), are arranged on the support 2, whether this be formed of a planar support or a frame, without the positions and orientations thereof being definitively fixed. The positioning optical fibers 3a, 3d of the entry stage 3 are connected to light sources, for example, lasers or superluminescent diodes 9a, 9b, which make it possible to inject the positioning light radiation 6b into the multi-passage cavity.

A circulator 10a, 10b for extracting the back-propagated light radiation from the optical fibers 3a, 3d and for directing it toward a measuring device 11 for measuring the power or intensity of the radiation, such as an optical power meter, is placed between the light source 9a, 9b and the entry stage 3. As an alternative to a circulator, it is possible for a fiber separator 12 to be placed between the light source and the entry stage.

Figure 4:
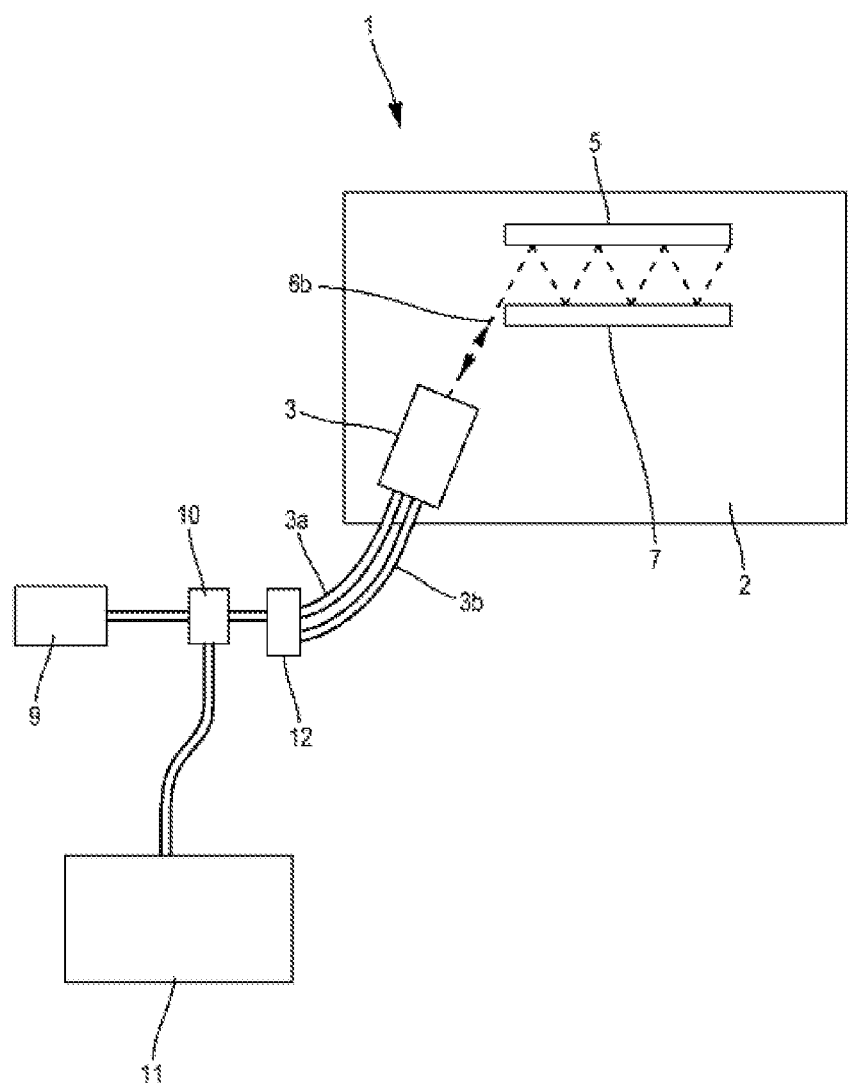
FIG. 4 is a schematic view from above of a different design of the assembly or testing system for an optical device 1 according to the present disclosure.

When the optical device 1 comprises a plurality of positioning optical fibers 3a, 3d, forming positioning light radiation that propagates over a plurality of reflective textured zones 5b, 5c that are separate from the optical element 5, it is possible to choose to separately measure the back-propagated reflective collected in the region of each positioning fiber, as is shown in FIG. 3. For the sake of simplifying the system, it is also possible to choose to optically combine the back-propagated positioning radiation collected by the positioning optical fibers, for example, by means of a fiber separator 12 arranged between a circulator 10 and the entry stage 3, or by means of a single separator that is arranged between the light source and the entry stage, and to then measure the combined light radiation. This configuration is shown in FIG. 4, and also makes it possible to use a single light source 9.

In this case, care is taken to select a light source 9 that emits radiation of which the coherence length is less than a length of the optical path separating the light source 9 from the measuring device 11. In this way, mutual interference of the combined radiation is prevented.

Other configurations are of course possible, combining one or a plurality of light sources 9, one or more circulators 10, one or more fiber separator 12, the number of entry and outlet paths of which can be selected freely.

Evaluation, Assembly and/or Testing Method

Using the system shown in FIG. 3, the present disclosure describes a very precise evaluation method for the optical device 1.

According to the method, the optical parts intercepting the first optical path 6a are placed, relative to one another, temporarily and without being fixed, by being retained, for example, by means of manipulation clamps for retention on the support 2. These parts comprise at least the entry stage 3 and the optical element 5. In the case of the preferred configuration of FIGS. 1 and 3, the parts also comprise the mirror 7.

This positioning is rough, i.e., the aim is to place the parts in an optimal position and orientation that it is generally not possible to achieve, due to the imprecise dimensioning of the parts, associated with the manufacturing tolerances thereof and the imprecision of the positioning and orientation on the support 2.

The light source 9 or the light sources 9a, 9b are activated, and the positioning light radiation 6b is injected via the entry stage 3.

The power of the back-propagated radiation is measured using the measuring device 11. An operator or positioning equipment adjusts the relative placement of the optical parts (position and orientation), for example, by manipulating the retention clamps, and attempts are made to achieve a power measurement that reaches or passes a target measurement. The target measurement may be a measurement that is fixed in advance, in terms of absolute power value, or the maximum power measured for all the relative positionings scanned during the step. The target measurement may also be expressed as a relative value between the power of the positioning radiation injected and the power of the back-propagated radiation.

Once the determined positioning and orientation of the parts placed in their arrangement provide or exceed the target measurement, the optical parts are fixed to the support 2, for example, by adhesive bonding. As has been seen, the fixing step can comprise the use of cubes or alignment parts, making it possible to fix the determined position and orientation by bringing into contact the surface of the support 2, one or more alignment parts, and a flat assembly surface of the part to be fixed to the support 2.

It is noted that, in order to facilitate the assembly, one of the optical parts can be fixed to the support 2 in advance, for example, by adhesive bonding, during the step of temporary placement. The assembly method thus aims to position the other optical parts relative thereto. This may, in particular, be the optical element 5.

It is also noted that the use of the method according to the present disclosure allows for very precise mounting of the device 1, since the same positioning fiber injects and collects the positioning radiation and the back-propagated radiation. Any deviation, even small, of the positioning or the orientation of one of the parts affects the propagation of the back-propagated radiation and the power of the radiation collected in the region of the entry stage 3. This very sensitive measure ensures very precise positioning of the assembled parts.

Following the complete assembly thereof, in particular, after having also assembled the output stage 4 on the support 2, when this is necessary, the optical device 1 is conventionally placed in a housing in order to protect it from the external environment and assure the robustness thereof.

According to an advantageous aspect of the present disclosure, the housing can be equipped with access points dedicated to the positioning fiber or fibers 3a, 3d. It is thus possible, by means of the same system shown in FIG. 3 or in FIG. 4, to proceed to testing the correct functioning of the device 1, in order to assure, for example, that the transportation thereof, the installation thereof, and the exposure thereof to thermal excursion, have not affected the functioning thereof, by displacement of the optical parts on the support 2.

The measurement of the power of the back-propagated radiation, and more precisely establishing the relative value between the power of the positioning radiation injected and the power of the back-propagated radiation, makes it possible to determine the state of functioning of the device. The step can, for example, be based on achieving a relative target value or a proportion of the relative target value. The target value can alternatively correspond to the measurement of the power determined at the time of mounting, and specifically associated with the device in question.

Of course, the present disclosure is not limited to the embodiment described, and it is possible to add variants thereto, without extending beyond the scope of the present disclosure as defined by the claims.

Although it has been indicated that the assembly interfaces were formed by bringing two planar parts into contact with one another, the present disclosure provides for reinforcing the adhesion thereof by means of adding glue or an adhesive layer, which can be formed prior to the assembly step or introduced between the two faces in contact, following the assembly thereof.

Furthermore, the optical element 5 is not necessarily formed of a wave plate; it may be a deformable mirror, a spatial light modulator (generally denoted by the acronym SLM), or any other means for imparting a controlled transformation of the phase of light radiation.

It will be noted that the entry stage 3 can be composed of a plurality of independent blocks, some of the blocks making it possible to inject the positioning radiation, and others of the blocks making it possible to inject the incident radiation. An entry stage 3 carrying a positioning fiber can also carry a fiber for extracting the transformed radiation, and thus also constitute an output stage. It is also possible to envisage a plurality of positioning fiber being carried by independent blocks of the entry stage 3, or by a plurality of entry stages 3.

It is also noted that the incident radiation and the transformed radiation may be injected and extracted, respectively, from the device 1 by means of simple propagation in free space. In this case, the entry stage carries only the positioning fibers.

It is likewise not necessary for the positioning light radiation to be separate from the incident light radiation. It is possible to use a portion of the incident radiation as positioning radiation.

However, in all the conceivable configurations, at least one beam of positioning radiation propagates, is reflected, and back-propagates along an optical path, in order to allow for positioning of at least some of the optical parts that constitute the device 1.

The materials that make up the different parts forming the cavity are advantageously the same, so as to limit the stresses of thermal origin that can be applied in the region of the assembly interfaces. It may, in particular, be silicon, glass or quartz.

The invention claimed is:

1. An optical device comprising: a plurality of optical parts arranged on support, at least one optical element comprising a main surface provided with a first microstructured zone for intercepting incident light radiation, which propagates along a first determined optical path, the first microstructured zone spatially modifying a phase of the incident light radiation in accordance with a determined spatial profile, and is configured for forming, by way of a plurality of reflections or transmissions on the optical element(s), transformed light radiation, the optical device further comprising an entry stage for guiding an injection of positioning light radiation, in accordance with a second optical path, wherein the main surface of the optical element comprises a second microstructured zone designed for reflecting the positioning light radiation and for backpropagating the positioning light radiation along the second optical path.

2. The device of claim 1, further comprising an output stage for the transformed light radiation.

3. The device of claim 2, wherein the incident light radiation is injected via the entry stage.

4. The device of claim 3, wherein the optical element is transparent with respect to the incident light radiation, and wherein the transformed radiation is formed, at least in part, by way of transmission of the incident light radiation through the transparent optical element.

5. The device of claim 4, wherein the optical element is reflective, and wherein the transformed radiation is formed, at least in part, by way of reflection of the incident light radiation on the reflective optical element.

6. The device of claim 5, comprising a mirror that is arranged opposite the reflective optical element in order to form a multi-passage cavity and to make it possible to project the incident light radiation and a positioning light signal along the first and the second optical path, respectively, a plurality of times.

7. The device of claim 6, wherein the second microstructured zone is designed so as to apply a transformation to the positioning radiation during the reflections or the transmissions preceding a backpropagation reflection.

8. The device of claim 7, wherein the optical element is a wave plate, a deformable mirror, or a spatial light modulator.

9. The device of claim 1, wherein the support is a planar support or a frame.

10. The device of claim 1, wherein the entry stage comprises at least one positioning optical fiber for injecting the positioning radiation.

11. An assembly or testing system for an optical device according to claim 10, the system comprising a light source optically connected to the positioning optical fiber, and a device for measuring a power of the back-propagated light radiation.

12. The assembly or testing system of claim 11, further comprising a circulator and/or a separator between the light source and the positioning optical fiber, for extracting the back-propagated light radiation toward the measuring device.

13. An evaluation method for an optical device according to claim 1, the method comprising the steps of:

injecting positioning light radiation into the optical device via the entry stage;

measuring the power of the back-propagated signal; and determining the operational state of the optical device, in accordance with the measured power value.

14. The method of claim 13, further comprising a step of placing the optical parts in a relative manner, with respect to one another, before injecting the positioning light radiation.

15. The method of claim 14, further comprising:

adjusting the relative placement of the optical parts in order to achieve a target power measurement or in order to maximize the power measurement and establish a determined position and orientation;

fixing the mutual relative placement of the optical parts in the determined position and orientation; and permanently fixing the optical element on a planar support.

16. The device of claim 1, wherein the incident light radiation is injected via the entry stage.

17. The device of claim 1, wherein the optical element is transparent with respect to the incident light radiation, and wherein the transformed radiation is formed, at least in part, by way of transmission of the incident light radiation through the transparent optical element.

18. The device of claim 1, wherein the optical element is reflective, and wherein the transformed radiation is formed, at least in part, by way of reflection of the incident light radiation on the reflective optical element.

19. The device of claim 1, wherein the second microstructured zone is designed so as to apply a transformation to the positioning radiation during the reflections or the transmissions preceding a backpropagation reflection.

20. The device of claim 1, wherein the optical element is a wave plate, a deformable mirror, or a spatial light modulator.

* * * * *

UNITED STATES PATENT AND TRADEMARK OFFICE
CERTIFICATE OF CORRECTION

PATENT NO. : 11,231,551 B2
APPLICATION NO. : 16/959050
DATED : January 25, 2022
INVENTOR(S) : Labroille et al.

Page 1 of 1

It is certified that error appears in the above-identified patent and that said Letters Patent is hereby corrected as shown below:

In the Claims

Claim 1, Column 13, Line 13, change "on support" to --on a support--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*